United States Patent
Aull et al.

(10) Patent No.: US 7,206,936 B2
(45) Date of Patent: Apr. 17, 2007

(54) REVOCATION AND UPDATING OF TOKENS IN A PUBLIC KEY INFRASTRUCTURE SYSTEM

(75) Inventors: Kenneth W. Aull, Fairfax, VA (US); Thomas C. Kerr, Fairfax, VA (US); William E. Freeman, Arbutus, MA (US); Mark A. Bellmore, Mt. Airy, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 947 days.

(21) Appl. No.: 10/027,944

(22) Filed: Dec. 19, 2001

(65) Prior Publication Data

US 2003/0115466 A1    Jun. 19, 2003

(51) Int. Cl.
*H04L 9/30* (2006.01)
*H04L 29/02* (2006.01)

(52) U.S. Cl. .......................... 713/173; 713/185; 726/20
(58) Field of Classification Search ................ 726/20; 713/185, 173
See application file for complete search history.

(56) References Cited

U.S. PATENT DOCUMENTS 5,757,920 A * 5/1998 Misra et al. .............. 713/158
6,192,131 B1 * 2/2001 Geer et al. ............... 380/283
6,278,783 B1 * 8/2001 Kocher et al. ............ 380/277
2001/0054155 A1 * 12/2001 Hagan et al. ............. 713/193

OTHER PUBLICATIONS

Housley et al., "Internet X.509 Public Key Infrastructure Certificate and CRL Profile", Request for Comments: 2459, Jan. 1999, pp. 1-113.

* cited by examiner

Primary Examiner—Kim Vu
Assistant Examiner—Venkat Perungavoor
(74) Attorney, Agent, or Firm—Tarolli, Sundheim, Covell & Tummino LLP

(57) ABSTRACT

A method and computer program to revoke and update a token (130) having several encryption, signature and role certificates/private keys contained in the token (130). The certificates/private keys in the token 130 are transmitted wrapped by a public key and may only be activated by a private key contained in the token (130). The activation of any certificate/private key requires the entry of a passphrase by a user (132). Further, all certificates/private keys contained in a token (130) are stored in an authoritative database 104. In the event that a token (130) is lost then all certificates/private keys associated with the token (130) are revoked. Further, when new certificates/private keys are issued to a user (132) these certificates/private keys are encrypted using the token's (130) public key and downloaded to the token (130).

16 Claims, 5 Drawing Sheets

REVOCATION AND UPDATING OF TOKENS IN A PUBLIC KEY INFRASTRUCTURE SYSTEM

BACKGROUND OF THE INVENTION

1. Field of the Invention

This invention relates generally to a method of revocation and updating of tokens in a public key infrastructure (PKI) and, more particularly, to a method and computer program for managing encryption, signature and role certificates/private keys contained in a token.

2. Discussion of the Related Art

For centuries individuals, governments, and business entities have searched for mechanisms and techniques whereby sensitive information may be transmitted to authorized parties over long distances and still remain secure. The problem faced by the foregoing entities is how can information be sent to the individual or entities that require it and still be assured that unauthorized parties may not be able to comprehend the transmitted information should they intercept it. Early methods of securing information have employed scrambling techniques, lookup tables, substitution ciphers, and code books in which letters or terms would be substituted for the original letters and terms in the information. These techniques frequently required that both the sender and receiver of information have access to the same "code book". One danger in such a technique is that the code book would fall into unauthorized hands.

In the early twentieth century, and in particular during World War II, code books were replaced by electromechanical cipher machines. Both the sender and receiver would have an identical cipher machine used to encrypt and decrypt messages sent. In order to make it more difficult to decrypt these messages the cipher machines have the ability to change the cipher used in a message or change the cipher used for every few words within a message. In order to accomplish this the cipher machine would need to know the initial state or key utilized to encrypt the message.

In recent years cipher machines have been replaced by digital encryption algorithms in which both the sender and receiver have an identical copy of the digital encryption algorithm and a common key used to encrypt and decrypt messages. Both the encryption algorithm and key are held secret by both the sender and receiver.

More recently another encryption technique has been developed in which two separate keys are used for encryption and decryption. A public key is transmitted freely to whoever requires it and is used to encrypt messages for a particular receiver. The receiver would have an associated private key which may be used to decrypt the message encrypted with the associated public key. For each public key there is only one private key and for each private key there is only one public key. When sending a message to several recipients it is necessary to have each recipient's public key. The message would then be separately encrypted using each recipient's public key and transmitted to that particular recipient. Therefore, if ten separate entities are to receive the same message, ten separate messages would be transmitted with each message encrypted with individual's public key. With the advent of the Internet, such a public key infrastructure has gained significant acceptance as discussed in request for comments number 2459, by Housley et al., entitled "Internet X.509 Public Key Infrastructure", herein incorporated in its entirety by reference.

In addition to the need for the encryption and decryption of messages, with the advent of electronic mail and the Internet a need has developed for a secure mechanism to indicate approval and acceptance by an individual. In the past an individual would typically show his approval or acceptance of such items as a contract or an order via a handwritten signature, a stamp, or a seal which would only be held by that individual. Anyone else that attempted to imitate such a signature, stamp, or seal would be subject to criminal penalties. With the advent of electronic mail and the Internet, a need has arisen to take advantage of the ease and speed of electronic mail to indicate, by a person or entity with proper authority, approval or acceptance of a contract or purchase. This has come to be known as a digital signature in which an individual may digitally sign a document.

This digital signature capability has been implemented using the same public key infrastructure previously discussed. However, instead of an entire document being encrypted, the document itself is passed through a one-way hashing algorithm that produces a small document, referred to as a digest. This digest is then encrypted using the individual's private key, also known as a private signing key, and is appended to the document. The receiver of the document can verify the authenticity of the digital signature (digest) by stripping the signature from the document and recomputing the hash function on the document to generate an as received digest. Using public signing key, included in the document or previously received, it is possible to decrypt the digest of the document and compare it to the digest as recomputed. If the two digests match, then the signature is authenticated and the document received is proved to be identical to the document signed by the sender. Therefore, using the aforementioned public key infrastructure it is possible to both encrypt and decrypt messages as well as digitally sign documents.

However, in the aforementioned public key infrastructure, several limitations exist. One such limitation is in order for a group of individuals or entities to transmit and receive the encrypted messages each individual must have created a key pair having a public key and a private key. Further, each individual or entity in a group is also required to have a separate public signing key and a private signing key in order to digitally sign documents. In order for other members of the group to be able to decrypt messages received it is necessary for members of the group to exchange key pairs including the private key. This may be necessary when a member of the group is not in the office due to illness or travel. Where such an exchange of key pairs does not take place, when an urgent encrypted message comes into, for example, the office of finance, human resources, or an engineering group in the corporation, only the person holding the private key may decrypt the message. When that person is unavailable, that message will not be decrypted and a prompt response will not be received by the sender. However, when key pairs are exchanged by members of a group, then all members who possess an individuals private key may decrypt all messages sent to that person, regardless of the nature the message or its sensitivity. This creates significant problems for businesses that need to respond quickly to customer requests and in which customer confidences must be maintained. This may most acutely be seen in law offices, medical offices and the military where delay in delivering a response may be very costly. Further, it is cumbersome for a large group of individuals or entities to exchange key pairs with one another. For example, where group contains 30 individuals, a total of 30 times 30, or 900 exchanges of key pairs must take place in order for anyone in the group to be able to decrypt any message received by any other member of the group.

Another limitation that exists deals with security and portability of certificates/private keys. Typically, certificates assigned to users have both private and public keys with each stored on a computer. These certificates/private keys are often limited to usage in those computer systems in which they are stored. Therefore, if a user desires to use another computer system he must move his certificates/private keys to that system. Further, personal computers connection to the Internet have proven to be vulnerable to infiltration and damage by unauthorized parties. Therefore, if private keys for encryption and signature certificates/private are stored on a personal computer which is directly or indirectly connected to the Internet, it is possible to copy the certificates/private keys and with some effort to determine the passphrase required to use the certificates/private keys.

Still another limitation to these certificates/private keys is that they are limited to usage in and between computer systems for exchange of digital information or signature purposes. It is often necessary in a corporation or government entity for certain physical areas to have restricted access. Normally, these areas are protected by security guards who check badges to allow access by individuals. However, these badges may not necessarily be authentic or current. Therefore, an individual whose access to a particular area has been revoked may still enter that area if he retains his badge.

Therefore, what is needed is a method and computer program in which certificates/private keys may be stored on a portable device that may be easily physically carried by an authorized user. This physical device should be able to contain a significant number of certificates/private keys assigned to that user. Further, this physical device should be readable by a computer system that is not necessarily the normal computer system accessed by the user. The certificates/private keys contained within this physical device should be able to operate in the same manner as any other encryption or signature certificates/private keys in a PKI system. In addition, these certificates/private keys should be protected from unauthorized access in the case of loss or theft. Still further, this physical device should also contain a special class of certificates/private keys which represent a role or organizational group and would allow an authorized user access to information for that group and the ability to make commitments or indicate approval on behalf of the group. Still further, this physical device should be of such a nature to be used as an identification means for access to restrictive areas and information.

SUMMARY OF THE INVENTION

In accordance with the teachings of the present invention, a token is disclosed having an identification number encoded on the token and a private key stored in the token. Further, the token contains a number of certificates/private keys wrapped in a public key which may be activated by the private key on the token and the entry of a passphrase.

Further in accordance with the present invention, a method and computer program for revoking a token in which a database is accessed having several records accessible by user identification and token identification in which the database has several certificates/private keys associated with each token identification. The method then revokes each certificate/private key associated with a selected token identification for a given token.

In another aspect of the invention, a method and computer program for updating a token in which a database is accessed by user identification and token identification in which the database has several certificates/private keys associated with each token identification. This method and computer program then determines which certificates/private keys have not been downloaded to the token since the last update. It then encrypts all certificates/private keys which have not been downloaded to the token using a public key associated with the token identification in the database to form a download packet. This download packet is then downloaded to the token and the certificates/private keys are activated using the private key in the token.

Additional objects, features and advantages of the present invention will become apparent from the following description and the appended claims when taken in connection with the accompanying drawings.

DETAILED DESCRIPTION OF THE PREFERRED EMBODIMENTS

Figure 1:
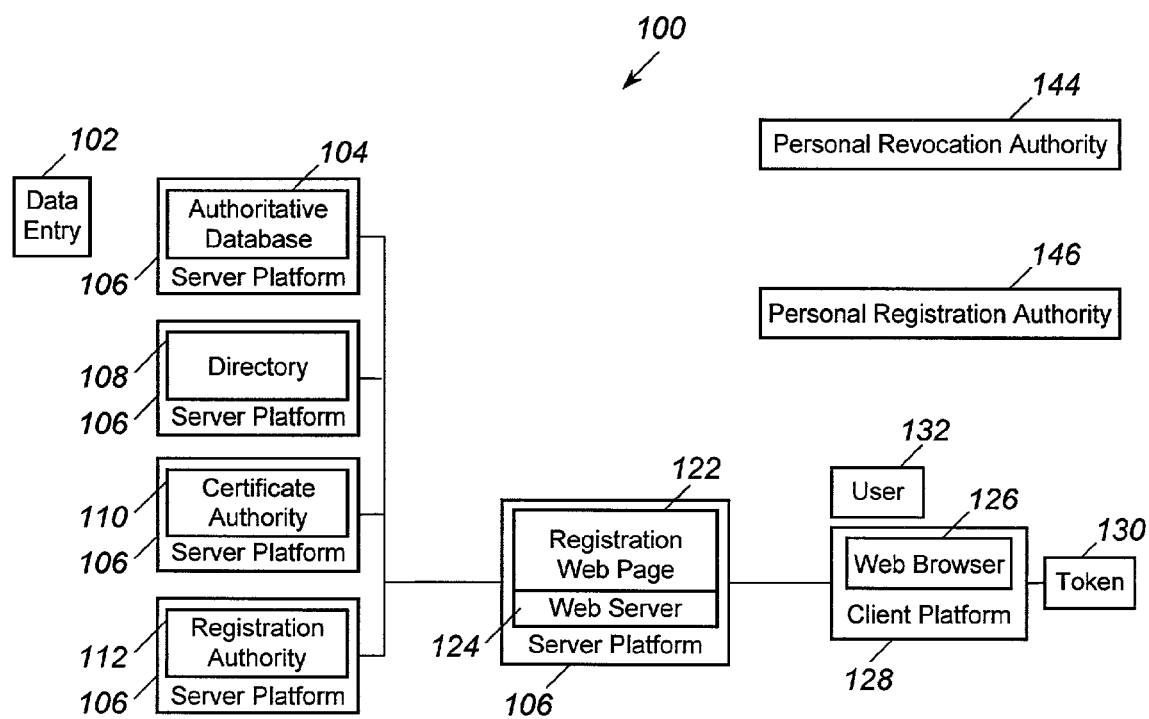
FIG. 1 is a module configuration diagram of the software, firmware, and hardware used in the embodiments of the present invention.

The following discussion of the example embodiments directed to a process for revocation and updating of token are merely exemplary in nature, and is in no way intended to limit the invention or its applications or uses.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same.

Before entering into a discussion of the flowcharts a brief discussion of the nature and function and structure of a role certificate is necessary. As will become apparent from review of FIGS. 2 through 5, the embodiments of the present invention are based on an X.509 certificate (V3) discussed in detail in item 4 of RFC 2459, previously incorporated herein by reference. The X.509 certificate is a public key certificate utilized for either encryption purposes or as a signature key. The information contained in the X.509 certificate will vary according to whether it is set up as a signature certificate or as a public key for encryption. The role certificate contains at least those fields shown in Table 1 ahead.

TABLE 1

X.509 (V3) Certificate version (V3)
serial number
signature algorithm ID
issuer name
validity period
subject name
subject public key information
issuer unique identifier
subject unique identifier
Extensions A role certificate is distinguished from other X.509 certificate (V3) in three ways. First, the subject name of the role certificate may distinguish it as a role certificate. Second, bits in the extension field, illustrated in Table 1, would be set to indicate that the role certificate may be used for both encryption and signature purposes. Third, policies may be associated with a role certificate to indicate limitations on the uses of the role certificate. These policies may be stored on the registration web server 124 accessible by user 132, shown in FIG. 1, who receives a signature certificate associated with an office. For example, a role certificate may be issued by the office of finance within the corporation to approve a purchase request. However, since several individuals within the office of finance may issue such a role certificate as a signature, that role certificate may have a dollar limitation policy associated with it, such as not valid for more than $100,000, for which the role certificate is valid. Anything above the dollar limitation would require the individual signature certificate of the chief financial officer in order be considered valid. Other limitations may be associated for a role certificate on an individual basis. Therefore, a role certificate may be distinguished from a X.509 (v3) certificate by any one or combination of the naming conventions used for the role certificate, policies associated with the role certificate that limit its use, the ability to use the role certificate for both encryption and as a digital signature by setting bits in the extensions, as well as its use by a group of individuals for encryption, decryption, and as a group signature.

FIG. 1 is a modular configuration diagram of the software, firmware, and hardware used in the embodiments of the present invention. The blocks illustrated in FIG. 1 represent modules, code, code segments, commands, firmware, hardware, instructions and data that are executable by a processor-based system(s) and may be written in a programming language, such as, but not limited, to C++. It should be noted that the modules depicted in FIG. 1 are shown as contained in separate server platforms. However, these modules are not limited to residing on separate servers and may reside and execute one computer or any number of computers depending on the number of users the system must handle and the communications involved. FIGS. 2 through 5 are flowcharts and modular configuration diagrams further detailing the operations executed by the modules shown in FIG. 1.

FIG. 1 illustrates an exemplary architecture 100 in which the Public Key Infrastructure (PKI) processes of the present invention may be practiced. However, as previously discussed, it should be understood that the present invention is not limited to the architecture 100 of FIG. 1. The Architecture 100 includes Data Entry 102 which performs a Data Entry function for Authoritative Database 104 which is resident on the server platform 106. A server platform 106 is referred to in this description but it should be understood that the present invention is not limited to any particular server architecture. The server platform 106 maybe without limitation UNIX or Windows NT servers. The authoritative database 104 contains information about members of the group or enterprise for which PKI services in accordance with the present invention are performed. The present invention is not limited by the structure of the group enterprise for which information is stored in the authoritative database 104. The authoritative database 104 information includes, without limitation, the name, address, telephone numbers, manager's name, employee identification etc., of the members of the group or enterprise. Directory 108 has the structure of the database but is optimized for fast look-up of information stored therein rather than fast data entry. The data in the Directory 108 is not changed frequently but is required to be "accessed rapidly and functions on-line as a fast phone book" containing reference information about the members of the group or enterprise stored in the authoritative database 104. Certificate/private key authority 110 is a conventional off-the shelf software executed on server platform 106 providing storage of certificates/private keys and related information used by the present invention as described in more detail hereinafter. Registration authority 112 is also off-the shelf software executable on server platform 106 regarding registration performed by the present invention as described in more detail hereinafter. Registration web page 122, which maybe one or more pages, functions as the user interface to the architecture 100 of FIG. 1. Web Server 124 is a software application which serves Web Pages such as Web Page 122 or other HTML outputs to a web browser client which may be without limitation Apache or a Microsoft Internet Information Server. Web browser 126 is resident on client platform 128 which may be any user computer. Web browser 126 is a client software application for browsing web pages such as but not limited to HTML or XML protocols or other protocols. The Web browser 126 is programmed to operate with PKI certificates/private keys issued by the certificate authority 110. Examples of web browsers which has this capability are Netscape Navigator and the Microsoft Internet Explorer. The token 130 is a smart card, or other hardware token capable of generating, storing and using PKI certificates. A user 132 is a person using the architecture 100. A user 132 transitions through a number of states which include a new user, current user and a former user who no longer is a member of the group or enterprise. Personal revocation authority 144 is a person who is in charge of revocation of members from the network 100. Personal registration authority 146 is a person who is in charge of registration of members in the network 100.

A limitation exists with the methods used to securely transport certificates/private keys for the User 132 between his Token 130 and the Server Platform 106 of the Certificate Authority 110. In typical PKI architectures, a unique X.509 private key and key encipherment certificate/private key is issued to each Server Platform 106. This issued to create a Secure Socket Layer (SSL) session between the Server Platform 106 and the Client Platform 128, so that all data transferred between these two platforms are encrypted and secure. However, a major security limitation exists because the last "6 inches" of the data path is not encrypted or secure; i.e., the path between the Token 130 and the Client Platform 128 to which it is attached. That data are transferred typically in plain text.

The Client Platform 128 is, therefore, a major point of vulnerability. Malicious code, such as viruses or Trojan horses, running surreptitiously on the Client Platform 128, could corrupt, replace, or intercept data being transferred between the Server Platform 106 of the Certificate Authority 110 and the destination Token 130.

The crux of our base invention lies in recognizing that tokens are manufactured with a unique identification number assigned to them and burned into a read-only location on the token. We create a unique private key and public key certificate for each token. In essence, we treat the Token 130 like any other end-entity in a public key infrastructure. It has a unique identity. We create a private key and public key certificate for it. Now, Token 130 can be the point of origination or destination of any signed and/or encrypted data communications. Before this invention, data transferred from the Sever Platform 106 and the Token 130 was encrypted between the Server Platform 105 and the Client Platform 128 and relayed as plain text (unencrypted) between the Client Platform 128 and the Token 130. After the invention, the data are encrypted all the way from the Server Platform 106 to the Token 130. The Client Platform 128 relays encrypted data, which it cannot decrypt or unwrap. The earlier security vulnerability does not exist.

Figure 2:
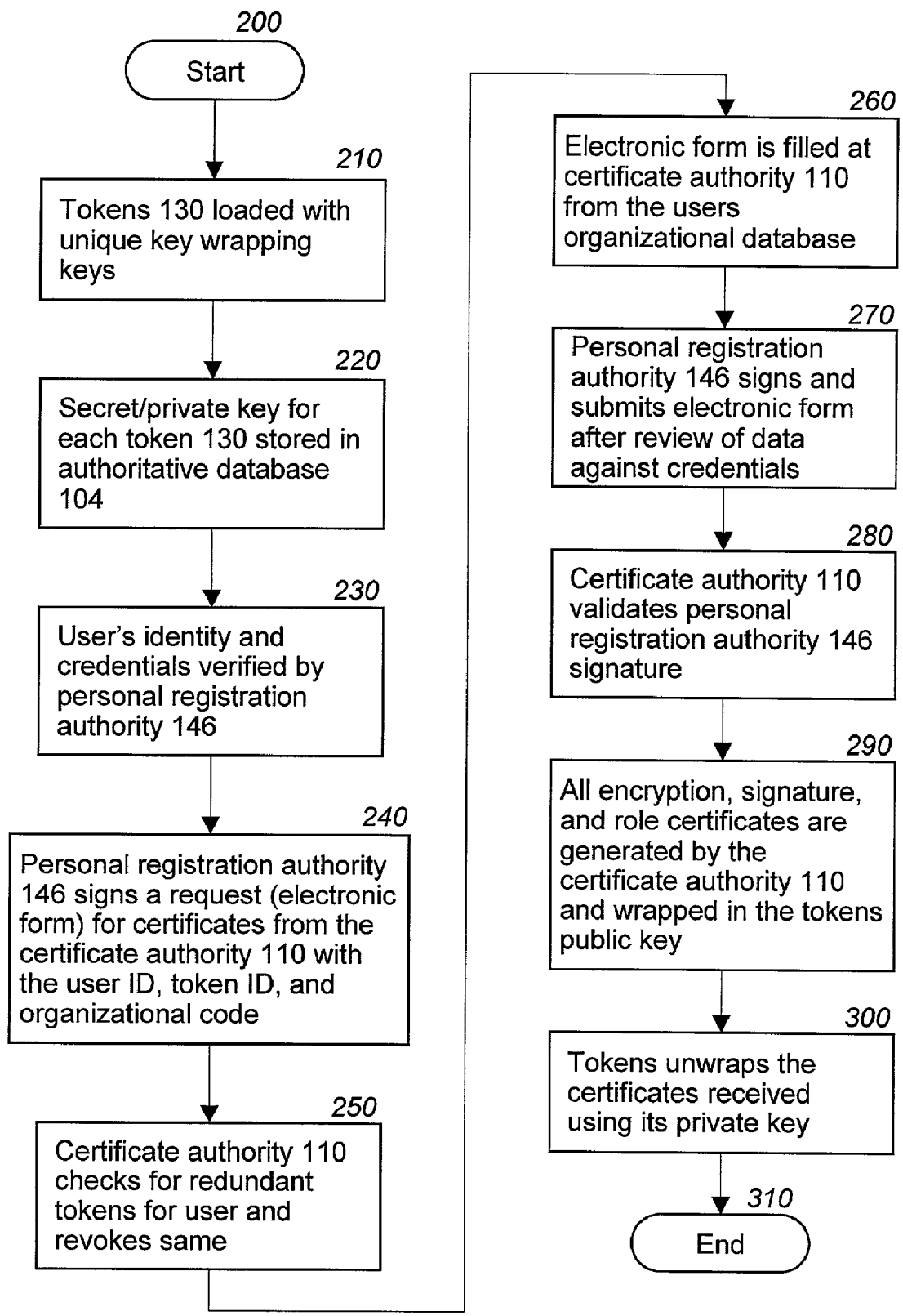
FIG. 2 is a flowchart of an example embodiment of the process for obtaining a token in the present invention.

FIG. 2 is a flowchart of an example embodiment of the process for obtaining a token 130 in the present invention. As previously discussed, a token 130 may be, but not limited to, a smart card or other device capable of storing and utilizing PKI certificates/private keys. Processing begins in operation 200 and immediately proceeds to operation 210. In operation 210, token 130 is loaded with a unique key used for wrapping certificates/private keys which may comprise public and private keys as well as encryption certificates/ private keys, signature certificates/private keys, and role certificates/private keys. This wrapping of certificates/private keys serves the function of encrypting and thereby protecting all items contained within the token 130 from individuals who do not have the associated passphrase. Processing then proceeds to operation 220 where the secret/ private key in the key pair generated in operation 210 is stored in the token 130. As will be discussed in further detail in reference to FIGS. 3–5, it is not necessary for a user to utilize a secure computer system to utilize and update the token 130 due to this wrapping of certificates/private keys utilizing the aforementioned wrapping key. In operation 230, the user's identity and credentials are verified by a personal registration authority 146. This personal registration authority 146 may be a badge or security officer. Thereafter, the personal registration authority 146 signs a request, which is an electronic form, comprising the users identification, token identification and organizational code. The token identification is embedded in each token during the manufacturing process and is a unique identifier. This information is transmitted to the certificate authority 110. In operation 250, the certificate authority 110 checks for redundant tokens 130 assigned to this user and revokes the same. In operation 260, the electronic form is filled with authentication data by the certificate authority 110 from the user's organizational database. In operation 270, the personal registration authority 146 signs and submits the electronic form after review of the authentication data against the credentials supplied by the user 132. Processing then proceeds to operation 280 where the certificate authority 110 validates the personal registration 146 signature certificate/private key. Operation 280 serves to verify the identity of the personal registration authority 146 and prevents tokens from being issued by unauthorized individuals. Processing then proceeds to operation 290 where all encryption, signature, and role certificates/private keys are generated by the certificate authority 110 and wrapped in the token 130 public key. This wrapping function serves to encrypt the certificates/private keys in order to prevent interception by unauthorized individuals. Thereafter, in operation 300 the token 130 may unwrap the certificates/private keys received using its private key and thereby activating the certificates/private keys. Only the token 130 has a private key that matches the public key is able to open a certificate/private key and activate it. Further, a passphrase may be required by the token 130 prior to attempting to open a certificate/private key. Processing then proceeds to operation 310 where processing terminates.

Figure 3:
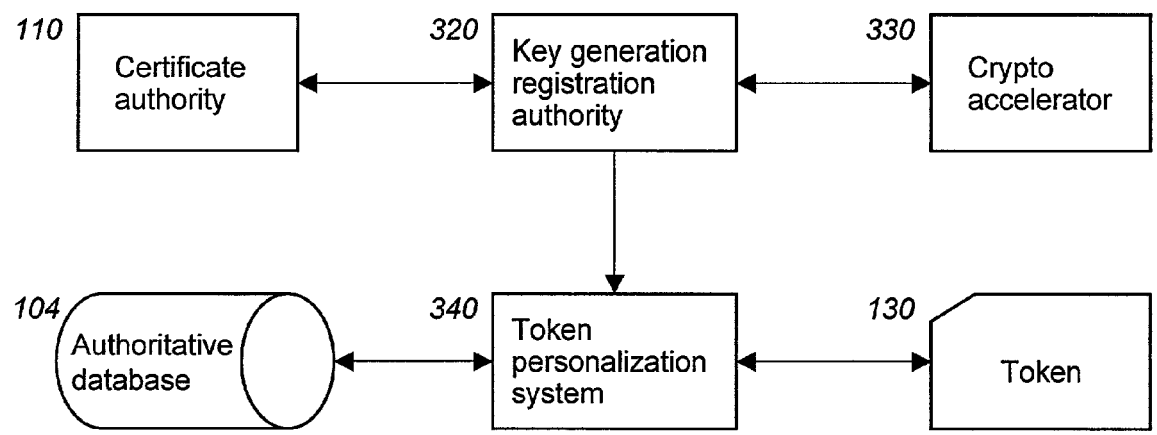
FIG. 3 is a modular diagram illustrating the process used to generate a public/private key pair used to encrypt the certificates/private keys contained in the token 130 in an example embodiment of the present invention.

FIG. 3 is a modular diagram illustrating the process used to generate a public/private key pair used to encrypt the certificates/private keys contained in the token 130 in an example embodiment of the present invention. As previously discussed in reference to FIG. 2, the certificate authority 110 would receive a request for the generation of a token 130. The certificate authority 110 would then access a key generation registration authority 320 to create the public/ private key pair required by the token 130. The key generation registration authority 320 would access a crypto accelerator 330 to generate the public/private key pair. Once the private/public key pair were generated this key pair would be transmitted to the token personalization system 340 that would create the necessary record in the authoritative database 104. This record would contain the token ID, generated by the manufacture of the token 130, and a unique public key for the token 130. Thereafter, a matching private key would be installed in the token. Some time thereafter, all the certificates/private keys would be encoded using the public key stored in the authoritative database and downloaded into the token 130 in the form of a download packet.

Figure 4:
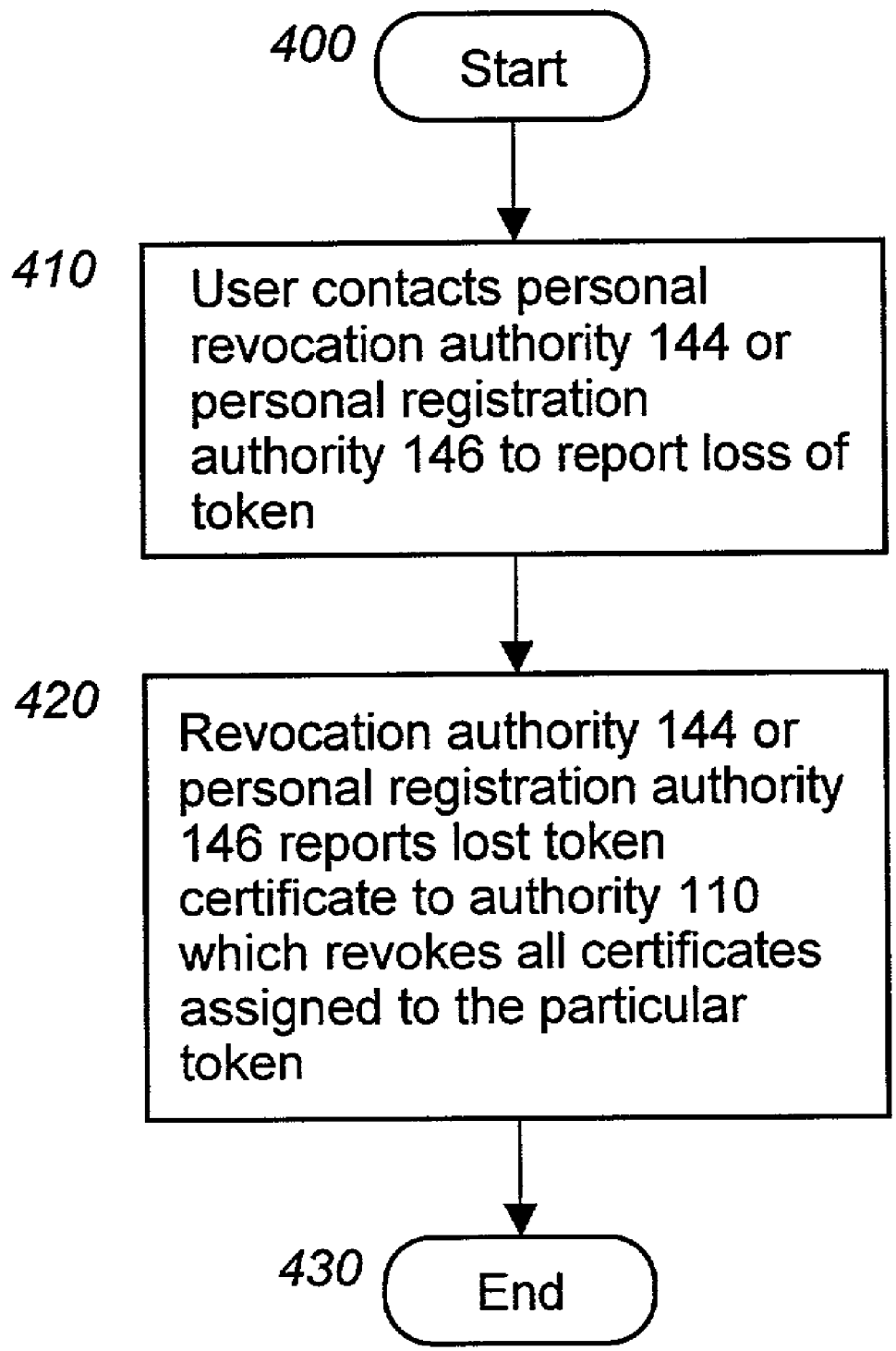
FIG. 4 is a flowchart illustrating the logic used to revoke certificates/private keys contained in a token 130 that has been lost in an example embodiment of the present invention.

FIG. 4 is a flowchart illustrating the logic used to revoke certificates/private keys contained in a token 130 that has been lost in an example embodiment of the present invention. Processing begins in operation 400 and immediately proceeds to operation 410. In operation 410, the user 132 contacts the personal revocation authority 144 or the personal registration authority 146 to report a lost or stolen token 130. In operation 420, the revocation authority 144 or personal registration authority 146 reports the lost token 130 to the certificate authority 110 which revokes all certificates/ private keys assigned to the token 130 as contained in the authoritative database 104 and previously discussed in reference FIG. 3. Processing then terminates in operation 430.

Figure 5:
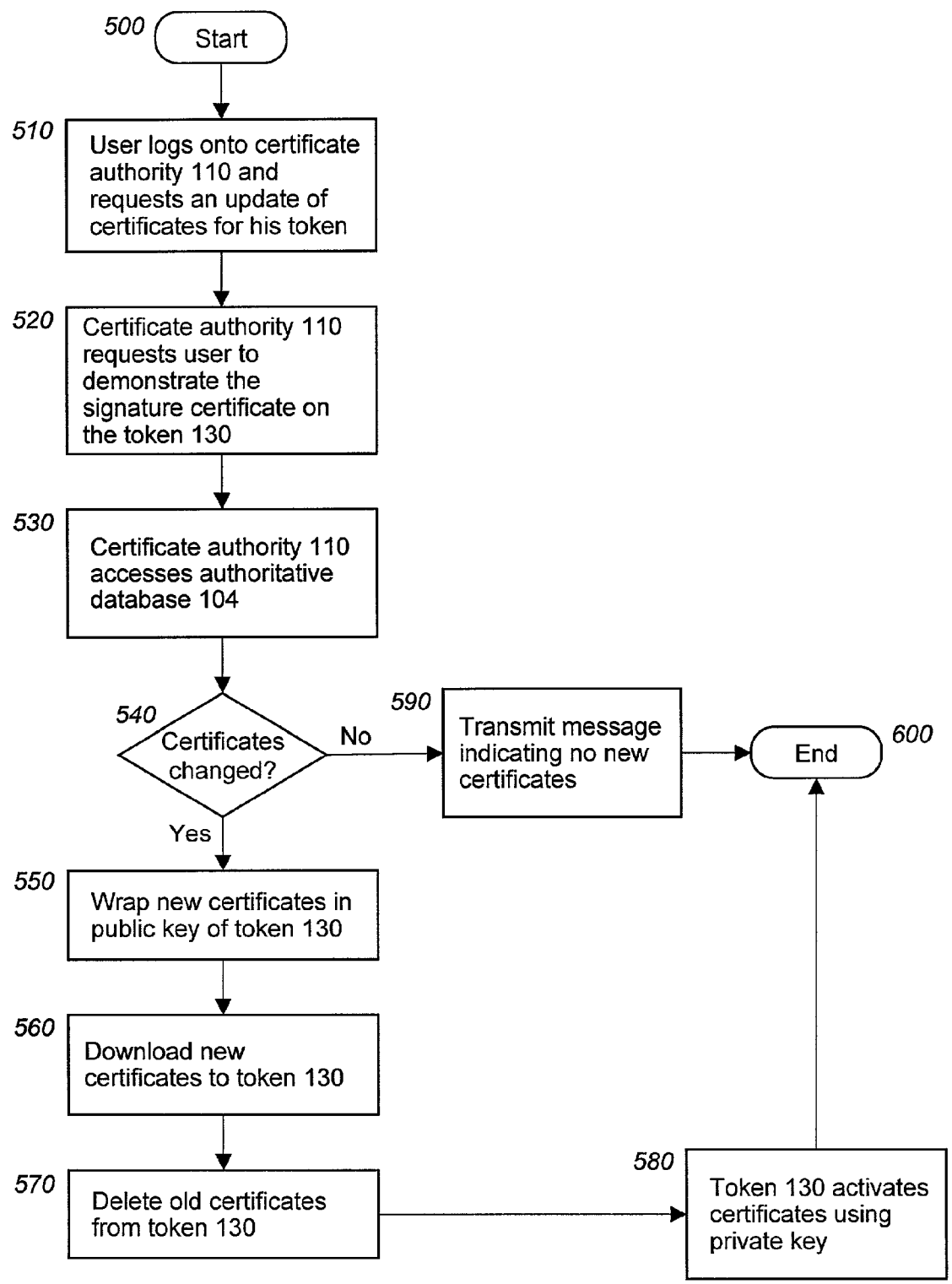
FIG. 5 is a flowchart illustrating the logic used to update certificates/private keys contained in a token 130 in an example embodiment of the present invention.

FIG. 5 is a flowchart illustrating the logic used to update certificates/private keys contained in a token 130 in an example embodiment of the present invention. The updating of token 130 would include all certificates/private keys contained therein but would be most relevant to role certificates/private keys which would change more frequently than the others. Processing begins in operation 500 and immediately proceeds to operation 510. In operation 510 user 132 logs onto the certificate authority 110 and requests an update of the certificates/private keys contained within a particular token 130. This process of logging onto the certificate authority 110 may be done at any computer system which can read the token 130. The computer system, such as client platform 126, maybe unsecured or use unsecured communications since any certificates/private keys transmitted would be wrapped in the token's 130 public key and could only be activated by the private key contained in token 130. Processing then proceeds to operation 520 where the certificate authority 110 requests a the user to sign utilizing the signature certificate/private key on the token 130. This signature certificate/private key serves to authenticate the user 132 since a passphrase for the token would also have to be entered by the user 132. In operation 530 the certificate of authority 110 accesses is the authoritative database 104. Then in operation 540 it is determined if any certificates/private keys assigned to the user and this particular token 130, based on token ID, have changed. If the certificates/private keys for this particular token 130 have changed then processing proceeds to operation 550. In operation 550 the new certificates/private keys generated are wrapped in the public key of token 130. This public key is retrieved from authoritative database 104 based upon the token ID number. In operation 560 the new certificates/private keys are downloaded to token 130 and in operation 570 any old token 130 that is being replaced by a new token 130 is deleted. Processing then proceeds to operation 580 where the token 130 may activate the new certificates/private keys using its private key. Thereafter, processing proceeds operation 600 where processing terminates.

Still referring to FIG. 5, if in operation 540 no new certificates/private keys were found in authoritative database 104, then processing proceeds to operation 590. In operation 590 a message indicating no new certificates/private keys were found, is transmitted to the user and again processing terminates in operation 600.

Using the embodiments of the present invention, an organization may create, revoke and update certificates/private keys contained in a token. Once the user receives a token from an authorized party, the user may use that token at any computer on any system that has the appropriate reader. These computers need not be secured or have secure communications for the certificates/private keys on the token to be used since downloaded certificates/private keys are wrapped in a public key. Further, in case of loss of a token, all certificates/private keys in that token may be revoked and a new token with new certificates/private keys may be provided the user.

While we have shown and described only a few examples herein, it is understood that numerous changes and modifications as known to those skilled in the art could be made to the present invention. For example, any type of computer architecture may be utilized for the embodiments of present invention. Further, the present invention may be written in any general-purpose computer language. Also, the token need not be limited to containing certificates/private keys but may also be used for passports, credit cards, drivers licenses, automated teller machine cards, or other types of cards since they would all be secured by being wrapped in the same public key as the certificates/private keys. Therefore, we do not wish to be limited to the details shown and described herein, but intend to cover all such changes and modifications as are encompassed by the scope of the appended claims.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method of updating a token, comprising:
   accessing a database by user identification and token identification, wherein the database has a plurality of certificates/private keys associated with each token identification;
   determining which certificates/private keys of the plurality of certificates/private keys have not been downloaded to the token since the last update;
   encrypting all certificates/private keys of the plurality of certificates/private keys which have been not been downloaded to the token using a public key associated with the token identification in the database to form a download packet;
   downloading the download packet to the token; and
   activating the certificates/private keys in the download packet using a private key in the token.

2. A method as recited in claim 1, further comprising:
   accessing the database by token identification to identify certificates/private keys which are expired or no longer valid; and
   deleting the certificates/private keys identified which are expired or no longer valid from the token.

3. The method recited in claim 2, further comprising:
   transmitting a message to the user indicating no new certificates/private keys were found in the database when determined that all certificates/private keys of the plurality of certificates/private keys have been downloaded to the token since the last update from the database.

4. The method recited in claim 3, wherein the plurality of certificates/private keys are at least one signature certificate/private key, encryption certificate/private key, and role certificate/private key.

5. The method recited in claim 4, wherein the token is a smart card.

6. A computer program embodied on a computer readable medium and executable by a computer for updating a token, comprising:
   accessing a database by user identification and token identification, wherein the database has a plurality of certificates/private keys associated with each token identification;
   determining which certificates/private keys of the plurality of certificates/private keys have not been downloaded to the token since the last update;
   encrypting all certificates/private keys of the plurality of certificates/private keys which have been not been downloaded to the token using a public key associated with the token identification in the database to form a download packet;
   downloading the download packet to the token;
   and activating the certificates/private keys using a private key in the token.

7. The computer program as recited in claim 6, further comprising:
   accessing the database by token identification to identify certificates/private keys which are expired or no longer valid; and
   deleting the certificates/private keys identified which are expired or no longer valid from the token.

8. The computer program embodied on a computer readable medium and executable by a computer as recited in claim 6, further comprising: accessing the database by token identification to identify certificates/private keys which are expired or no longer valid; and deleting the certificates/private keys identified which are expired or no longer valid from token.

9. The computer program embodied on a computer readable medium and executable by a computer recited in claim 8, wherein the plurality of certificates/private keys are at least one signature certificates/private key, encryption certificates/private key, and role certificates/private key.

10. The computer program embodied on a computer readable medium and executable by a computer recited in claim 9, wherein the token is a smart card.

11. The method recited in claim 1, wherein the activating the certificates/private keys further comprises the entry of a passphrase.

12. The method recited in claim 1, further comprising: revoking each certificate/private key associated with a selected token identification for a given token.

13. The method recited in claim 1, wherein the token identification is assigned by the token manufacturer at the time the token is created and stored in the database when assigned to a user.

14. The computer program embodied on a computer readable medium and executable by a computer recited in claim 6, wherein the activating occurs in response to receipt of a passphrase.

15. The computer program embodied on a computer readable medium and executable by a computer recited in claim 6, wherein the token identification is assigned by the token manufactured at the time the token is created and stored in the database when assigned to a user.

16. The computer program embodied on a computer readable medium and executable by a computer recited in claim 6, further comprising: revoking each certificates/private key associated with a selected token identification for a given token.

* * * * *